United States Patent [19]
Maher

[11] Patent Number: 5,450,493
[45] Date of Patent: Sep. 12, 1995

[54] SECURE COMMUNICATION METHOD AND APPARATUS

[75] Inventor: David P. Maher, Windham, N.H.

[73] Assignee: AT&T Corp., Murray Hill, N.J.

[21] Appl. No.: 175,066

[22] Filed: Dec. 29, 1993

[51] Int. Cl.⁶ .............................................. H04L 9/30
[52] U.S. Cl. ........................................ 380/30; 380/23
[58] Field of Search .................................. 380/23-25, 380/30

[56] References Cited

U.S. PATENT DOCUMENTS

| | | |
|---|---|---|
| 4,200,770 | 4/1980 | Hellman et al. |
| 4,771,461 | 9/1988 | Matyas ................................ 380/24 |
| 5,311,596 | 5/1994 | Scott et al. ...................... 380/23 X |
| 5,347,580 | 9/1994 | Molva et al. ..................... 380/25 |

*Primary Examiner*—Gilberto Barrón, Jr.

[57] ABSTRACT

In communication devices for conducting secure communications over insecure channels, means for detecting active attacks on voice or video communication is provided. These means enhance security of exchange of certificates, netkeys, and the like for use in securing subsequent voice, video, data, or facsimile communications.

3 Claims, 4 Drawing Sheets

Figure 1

(Prior art)

SECURE COMMUNICATION METHOD AND APPARATUS

BACKGROUND OF THE INVENTION

1. Field of the Invention

This invention relates to communications, and particularly to secure communications conducted over insecure channels using public-key methods.

2. Description of the Related Art

Communications in many media (voice, video, facsimile, data, etc.) take place over many kinds of channels (wire, radio, fiber optics, etc.). Radio communications may easily be intercepted, and wire and fiber optic communications may be intercepted by one with the requisite knowledge and equipment.

When sensitive or proprietary information is to be communicated, means are sought to ensure that only authorized parties are permitted to receive (and in some cases, to send) such information. Many solutions involve "scrambling" or "encrypting" the information in ways that only an authorized receiving entity should be able to restructure.

In modern cryptology it is usual for each party to a conversation or transmission to employ a security device comprising digital electronic computation means to operate on digital data (voice or video signals having first been digitized) with sophisticated mathematical algorithms. Typical methods involve the use of "cryptovariables" or "keys" known only to authorized senders and authorized receivers. A sender encrypts plaintext messages into ciphertext messages using a key, and the receiver decrypts the ciphertext using that key; interceptors, presumably not knowing the key, are unable to recover the plaintext.

Since the sender and receiver may be at considerable physical remove, logistical problems arise in propagating the keys between them; secure channels must be found for the purpose, such as couriers; such secure channels tend to be slow and expensive.

To alleviate these problems, methods known as "public key" methods have been devised wherein two entities may determine a common cryptovariable upon initiation of their communication by exchanging information based on secret parameters known only to each of them, and then performing computations involving those secret parameters. The information they exchange is known as "public keys", and is subject to interception; an interceptor, presumably without access to the aforementioned secret parameters, is unable to determine the cryptovariable and thus cannot decrypt the ensuing ciphertext.

The prior-art public key methods are, however, subject to a "man-in-the-middle attack" by a "spoofer". A spoofer may intercept a call from the calling party, and place a separate call to the intended called party, concatenating the two calls with himself "in the middle"; using the aforementioned public key methods, he establishes encrypted communication with both of them (with an extremely high probability of using different cryptovariables with each); he recovers the plaintext from one according to the appropriate cryptovariable, and re-encrypts it and passes it on to the other according to the appropriate cryptovariable, having full access to all plaintext.

SUMMARY OF THE INVENTION

The present invention provides, in a manner infeasible to spoof in voice or video communication, verification between the calling party and the rightful called party that they have computed the same cryptovariable. Should such verification fail the parties conclude that they are under man-in-the-middle attack and refrain from transmitting sensitive information.

Collaterally to computing their cryptovariables, the parties compute and display an "antispoof variable" which is small enough as to be easily read by each party to the other, yet large enough as to render it unlikely that each party and the spoofer will compute the same antispoof variable. Each party reports the antispoof variable to the other. In voice or video communication it is infeasible for a spoofer to spoof these reports without being detected.

It is thus an object of the present invention to provide improved public-key secure communications.

It is a particular object of the present invention to provide public-key secure communications resistant to man-in-the-middle attack.

The novel features of construction and operation of the invention will be more clearly apparent during the course of the following description, reference being had to the accompanying drawings wherein has been illustrated a preferred form of the device of the invention.

DESCRIPTION OF THE PREFERRED EMBODIMENTS

One finds in common use public-key cryptographic systems based on the well-known Diffie-Hellman algorithm, set forth in U.S. Pat. No. 4,200,770, issued Apr. 29, 1980 to Hellman et al.

Figure 1:
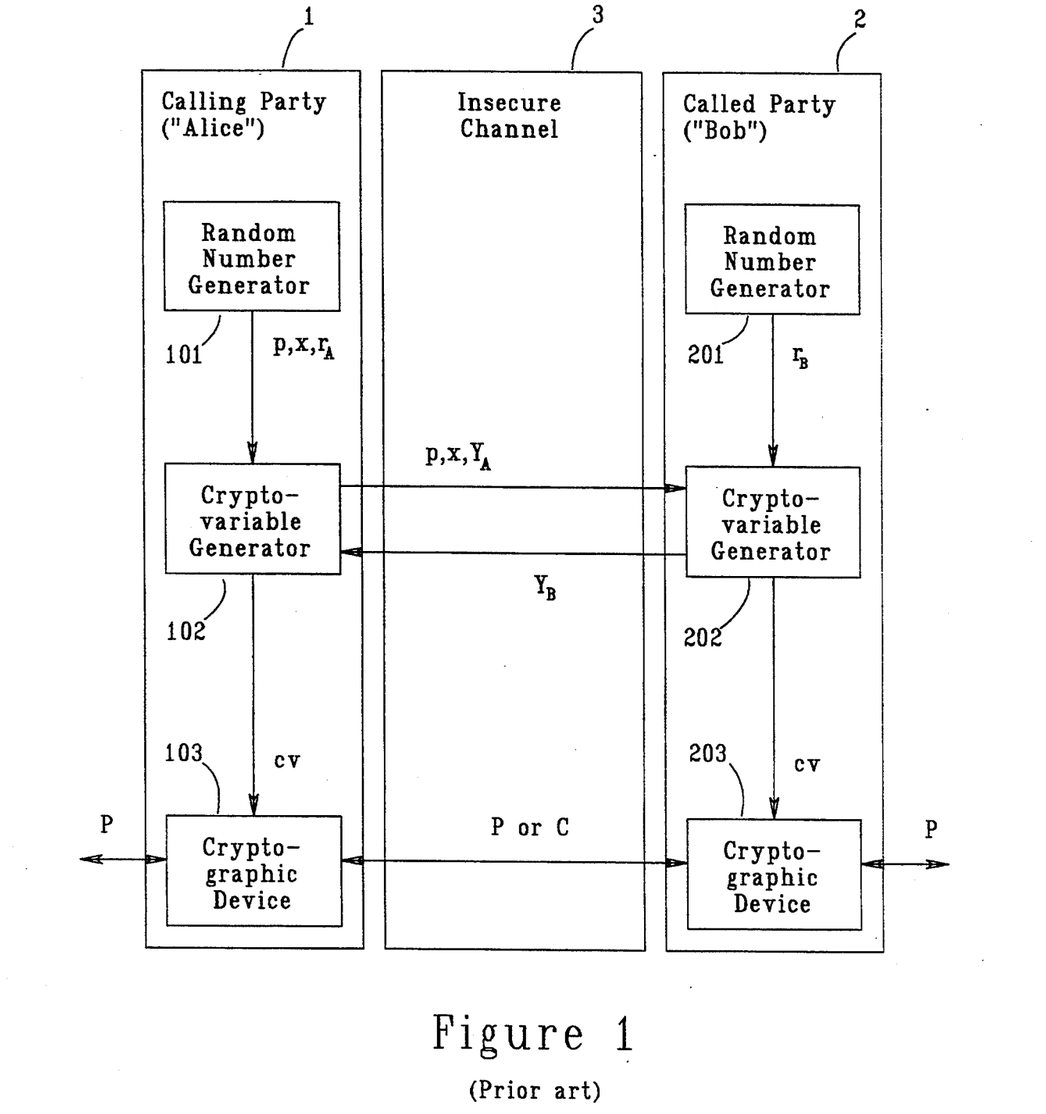
FIG. 1 schematically depicts a public-key communication system of the prior art.

FIG. 1 depicts a secure communication system of the prior art employing the Diffie-Hellman algorithm. A calling party places a voice telephone call to called party over insecure channel 3. The calling party has a security device 1 comprising digital electronic computation means, namely a random number generator 101, a cryptovariable generator 102, and a cryptographic device 103; the called party has a similar device 2. In order to attain mnemonic clarity in the ensuing discussion, calling party 1 will be referred to as "Alice" and called party 2 as "Bob", which will be correlated with subscripts "A" associated with Alice and subscripts "B" associated with Bob.

Alice and Bob are presumed to have telephone instruments (not shown) that generate digital representations of their voices, designated as the plaintext P. At the initiation of the call, Plaintext P is passed directly (i.e. without encryption) through cryptographic devices 103 and 203. Alice's random number generator 101 provides:

p, a prime number of the form $2q+1$ (where q is a prime number) and having a binary vector length N. (N is $>=512$ and is typically 1024)

x, a number in the integers mod p, called the base vector $r_A$, a random number in the integers mod q; the present embodiment uses a number of at least 160 bits.

Cryptovariable generator 102 computes $$Y_A = x^{r_A} \bmod p$$

and sends p, x, and $Y_A$ over insecure channel 3 to Bob's cryptovariable generator 202 (Alternatively, p and x may have been previously agreed upon, in which case only $Y_A$ is transmitted.) It is important to note that these values are transmitted "in the clear"—i.e., encryption has not yet begun. Any eavesdropper on the channel 3 could have access to them, but could not determine $r_A$ or $r_B$ from them since the functions for computing $Y_A$ and $Y_B$ are one-way functions; i.e., it is mathematically infeasible to determine their factors or roots. (See the aforementioned Hellman patent at column 5, lines 1–41)

Upon receipt of those values Bob's random number generator 102 provides $r_B$, a random number in the integers mod q; the present embodiment uses a number of at least 160 bits. Cryptovariable generator 202 computes $$Y_B x^{r_B} \bmod p$$

and sends $Y_B$ over insecure channel 3 to Alice's cryptovariable generator 102.

Alice now has Bob's $Y_B$ and Bob has Alice's $Y_A$. After checking $Y_A$ and $Y_B$ for nontriviality (a spoofer may have provided a trivial value as will be discussed further below) both now compute the Diffie-Hellman variable.

Cryptovariable generator 102 computes $$\begin{aligned} dh_A &= Y_B x^{r_A} \bmod p \\ &= x^{r_B} x^{r_A} \bmod p \\ &= x^{r_A r_B} \bmod p \end{aligned}$$

while cryptovariable generator 202 computes $$\begin{aligned} dh_B &= Y_A x^{r_B} \bmod p \\ &= x^{r_A} x^{r_B} \bmod p \\ &= x^{r_A r_B} \bmod p \end{aligned}$$

It is thus seen that $dh_A 32 dh_B$, or that Alice and Bob have both computed the same Diffie-Hellman variable. Yet an eavesdropper on the insecure channel 3 could not compute the Diffie-Hellman variable because of his lack of access to $r_A$ or $r_B$ and the aforementioned infeasibility of determining them from $Y_A$ or $Y_B$.

The Diffie Hellman variable will henceforth be referred to as dh. It is somewhat impractical to use dh directly as the cryptovariable cv, since dh is a very large number (typically 512 to 1024 bits as noted above) and as such may tend to slow down the repetitive operations of encryption and decryption. Thus, cryptovariable generators 102 and 202 will form $$cv = f_1(dh)$$

where $f_1$ is a mapping of binary vectors of length N to binary vectors of length K, where K is less than N. Typical values for K are 56 through 80.

Cryptographic devices 103 and 203 are now activated, and under control of cryptovariable cv they encrypt plaintext P into ciphertext C for transmission on insecure channel 3, and decrypt ciphertext C received from channel 3 to plaintext P. Alice and Bob may thus carry on what appears to them to be an ordinary telephone conversation, while eavesdroppers on channel 3 cannot determine the plaintext.

Figure 2:
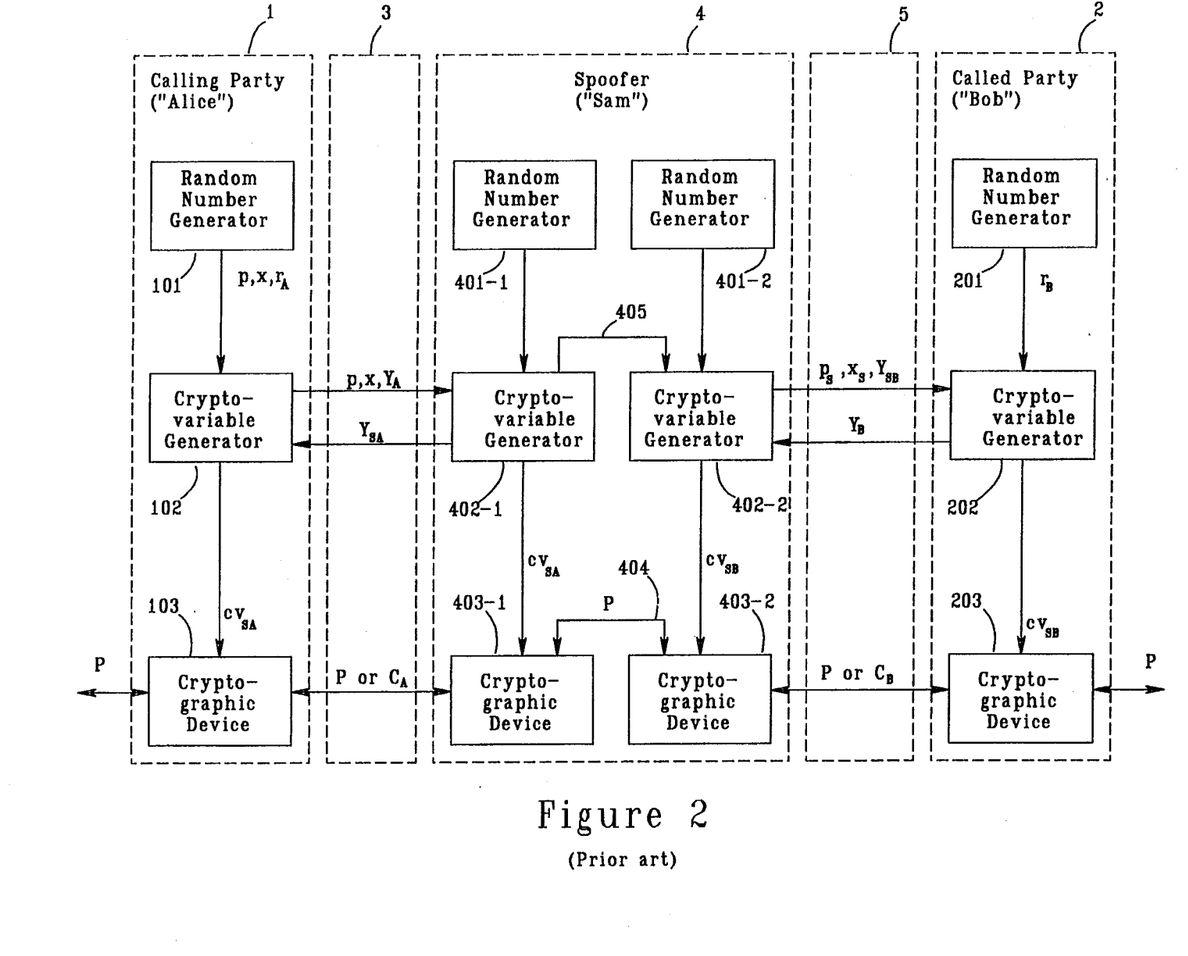
FIG. 2 schematically depicts a public-key communication system of the prior art under man-in-the-middle attack.

However, the prior-art method just discussed is vulnerable to a man-in-the-middle attack, as depicted in FIG. 2. Alice 1 attempts to place a call to Bob 2 over channel 3; a spoofer, Sam 4, intercepts Alice's call and immediately places a call to Bob over insecure channel 5. Sam is equipped with security devices analogous to Alice's and Bob's. Sam concatenates his cryptographic devices 403-1 and 403-2 by means of link 404 so that Alice and Bob perceive that they are in normal communication with each other and perceive no indication that a spoofer has intercepted their call.

As discussed in connection with FIG. 1, Alice sends p, x, and $Y_A$ over channel 3, and they are received by Sam's cryptovariable generator 402-1. Sam's cryptovariable generator 402-2 then sends $P_S$, $x_S$, and $Y_{SB}$ to Bob's cryptovariable generator 202. These may be verbatim passings-on of p, x, and $Y_A$ over link 405 as received from Alice, or they may be arbitrary coinages. $Y_{SB}$, particularly, may be assigned a trivial value (perhaps 1 or $-1$) by Sam in the hope that later by examination of the ciphertext encrypted with a cryptovariable cv derived from that value (which Bob will have used as $Y_A$ of FIG. 1) he will be able to "crack" Bob's secret parameter $r_B$ from examining the ciphertext C.

Similarly, Sam will return $Y_{SA}$ to Alice in lieu of $Y_B$ of FIG. 1. It is of no consequence whether Sam computes $Y_{SA}$ from p and x received from Alice and a large binary number from his random number generator 401-1, or whether he coins it arbitrarily, since Sam will not be originating any portion of the text passed in the communication between Alice and Bob and therefore has no need to protect anything. Sam may choose to make $Y_{SA}$ a trivial value, again in the hope of cracking Alice's secret parameter $r_A$ from later inspection of the ciphertext encrypted with a cryptovariable computed using that trivial value of $Y_{SA}$.

Alice and Sam both compute the same cryptovariable $cv_{SA}$ based on Alice's $Y_A$ and Sam's bogus $Y_{SA}$. When Alice initiates encryption in her cryptographic device 103 under control of that cryptovariable, she will believe that only Bob can decrypt the ciphertext $C_A$ when actually only Sam can.

Bob and Sam both compute the same cryptovariable $cv_{SB}$ based on Bob's $Y_B$ and Sam's bogus $Y_{SB}$. When Bob initiates encryption in his cryptographic device 203 under control of that cryptovariable, he will believe that only Alice can decrypt the ciphertext $C_B$ when actually only Sam can.

The plaintext of the dialogue between Alice and Bob appears on link 404; Sam decrypts ciphertext $C_A$ from Alice into plaintext P, and re-encrypts it into clphertext $C_B$ and forwards it to Bob; Sam decrypts ciphertext $C_B$ from Bob into plaintext P, and re-encrypts it into ciphertext $C_A$ and forwards it to Alice. Sam has full access to the plaintext P on link 404, while Alice and Bob perceive no indication that anything is amiss with the conversation they believe to be secret.

Method 1: Anti-spoof variables

Figure 3:
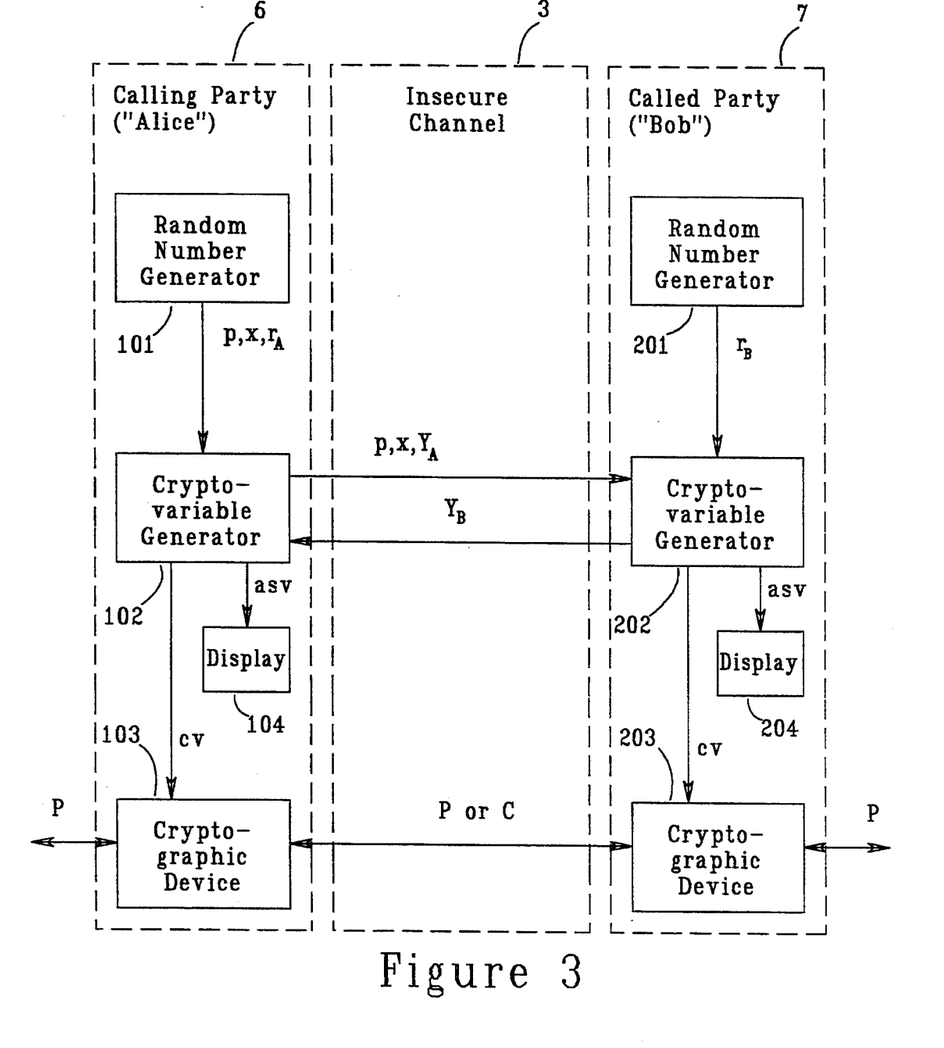
FIG. 3 schematically depicts a public-key communication system according to the present invention.

FIG. 3 depicts a secure communication system according to the present invention. The two parties to an intended secure communication have security devices 6, 7 according to the present invention. Security device 6, for example, is equipped with display 104 which, in a present embodiment, can display four hexadecimal digits.

The parties exchange public key information p, x, $Y_A$, and $Y_B$ and compute dh as in the prior art. As in the prior art, they compute the cryptovariable cv $$cv = f_1(dh).$$

According to the present invention, they also compute the antispoof variable asv $$asv = f_2(dh)$$

where $f_2$ is a mapping from N-bit vectors to 4-digit hex vectors. Each party's antispoof variable asv is then displayed on displays 104 and 204 respectively. Absent an attack the two displays should be identical, but if an attack is in progress they will be different since the parties compute different values of dh. The parties report the displayed asv's to each other, and do not proceed with secure communication unless their asv's compare.

If Alice and Bob's call is under man-in-the-middle attack by spoofer Sam, two factors operate to preclude Sam from spoofing the asv comparison:

1. Even if Sam's security devices are according to the present invention, they will not compute the same asv for the channel between Alice and Sam as for the channel between Sam and Bob. (As discussed above, there is a very high probability that the the values of dh will be different for the two channels; therefore, $asv = f_2(dh)$ will also have different values for the two channels.)

2. Although Sam, having full access to Alice and Bob's dialogue, can know when Alice and Bob are reporting their asv's, in a voice call it is virtually impossible for Sam to report his asv to Bob in such a manner that Bob is not alerted that anyone other than Alice is speaking to him, or for Sam to report his asv to Alice in like manner. Alice and Bob will thus know from the non-agreement of the asv's they report to each other that their call is under man-in-the-middle attack by a spoofer, and will terminate their call without attempting to pass any sensitive information.

If Alice and Bob split their random-component messages into two approximately equal halves, and fully transmit the first halves before transmitting the second halves, a spoofer will be precluded from mounting a birthday attack to discover their secret parameters.

Method 2: Netkeys

Figure 4:
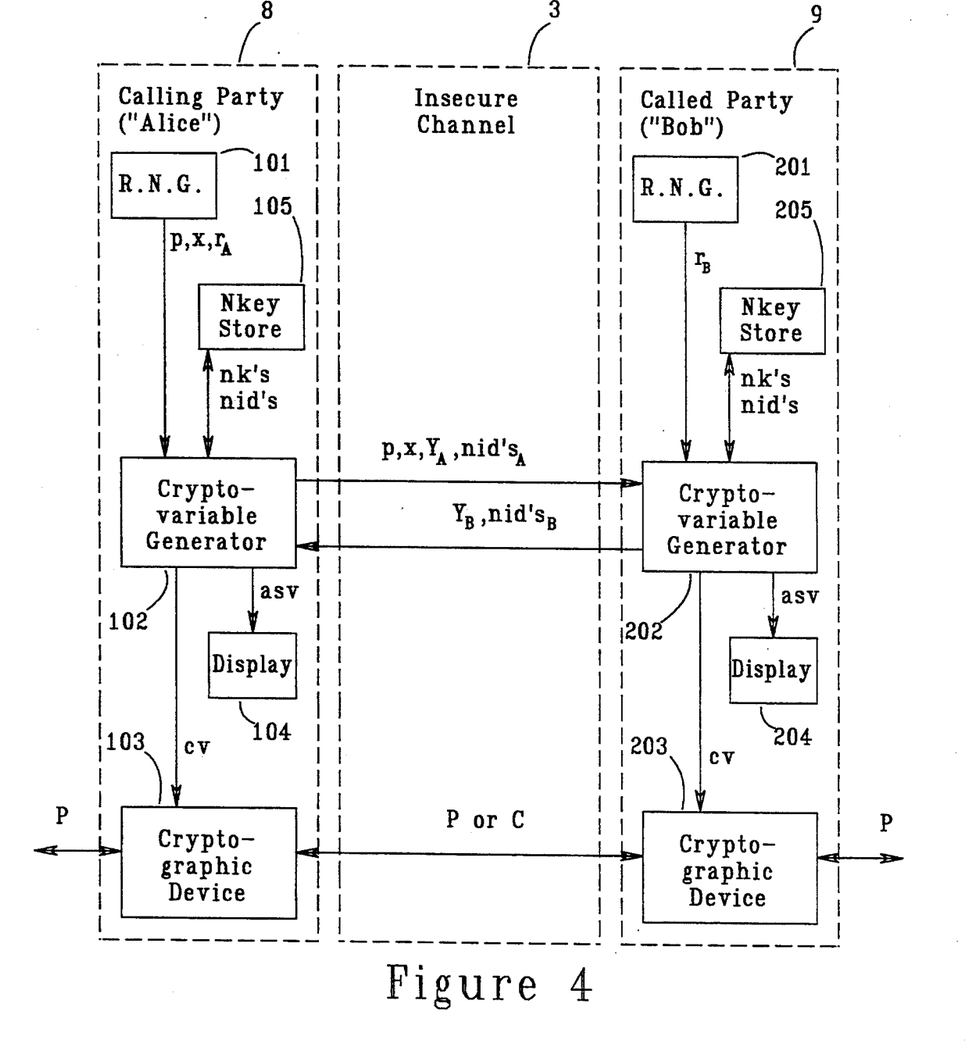
FIG. 4 is a schematic depiction of a public-key communication system according to the present invention and using netkeys.

The asv confirmation depends on voice communication for the two parties to make positive identification of one another. Another scheme for defeating a spoofer involves a shared secret known to the two parties and not accessible to the spoofer. Referring to FIG. 4, the parties each have security devices such as device 8, which includes a netkey store 105 in which are stored secret netkeys nk indexed by netkey indices nid. Suppose that Alice and Bob want to make a secure fax call, and they find the Diffie-Hellman key exchange convenient. Concomittantly with the Diffie-Hellman exchange, they determine whether they have a netkey in common; this may be accomplished by exchanging lists of nid's, or alternatively Alice may have used the serial number of Bob's encryptor (automatically transmitted after initiation of the call) as the hid, and vice-versa for Bob. If they do have a common netkey, the common netkey is here designated $nk_C$. Then active attacks by a spoofer can be defeated if Alice and Bob compute the cryptovariable as $cv = f_3(dh, nk_c)$.

In this case, the function $f_3$ can be fairly simple (such as a projection on dh, followed by a mod-2 vector sum with nk). However, often it is advisable for this function to be a one-way hash value. This is only really necessary if dh were to be re-used, a situation that can be helpful in some protocols.

Suppose a community of secure terminal users (for voice, video, fax, or data) is broken down into independent "subnetworks" and each subnetwork is defined by a netkey, nk. Each netkey has a unique index value nid. Then when Alice calls Bob they check as described above to see if they have a common value. If so, then they can proceed with a Diffie-Hellman exchange, and use the common netkey as above. Alice and Bob can then be assured that they are each talking to someone who knows the netkey value, and is therefore "on the net." The cryptovariable, cv, is still unique to the session however, so that if someone should subsequently compromise the netkey, all previous traffic is still protected, and all future traffic is subject only to active attacks using the compromised netkey. Passive attacks will be unsuccessful. This approach will work well for all kinds of traffic (voice, data, video, FAX, etc.).

Method 2A: Using anti-spoof variables to secure the establishment of a common netkey:

There remains the matter of getting the actual common netkey to both Bob and Alice; transmitting it in the clear or over a possibly compromised secure channel should not be attempted; aforementioned alternatives, such as a courier service, are slow and expensive. The aforementioned asv verification can be used to establish a netkey in a manner not vulnerable to man-in-the-middle-attack, so that the netkey will not be compromised. Suppose that Alice and Bob have just decided to do business together and do not have a common netkey, but want to be able to send faxes securely to one another with assurance as to the source and destination of the fax plaintext. In order to establish a common netkey, Alice initiates a call to Bob using her security device 8. Her cryptovariable generator 102 determines that there is no common netkey between Alice and Bob, so it proceeds with a key exchange complete with computation and display of the asv values. Alice and Bob then speak to one another and verify the asv values; if the asv values agree, the cv value is stored as a netkey nk instead of as a cryptovariable. The fax call, and subsequent fax calls, can proceed using the netkey-based protocol. In Alice's terminal the netkey thus established can be stored and associated with a nid such as either Bob's phone number, or more properly with the serial number of Bob's FAX encryptor (which gets transmitted at the beginning of a FAX call, as noted above), and vice-versa for Bob. Alice and Bob never have to prearrange, or attend, another fax call.

Method 3: Certificates:

The above methods are fairly simple, can be administered with minimal overhead, and they provide closely held control. These methods are ideal for users who know one another, which is usually the case in commercial secure voice, video, and fax communications, but not always. In military communications, security will be necessary, but it is much more likely that the people at the ends of a channel have never met or spoken to one another. The commercial world appears to be evolving toward operations where secure and authenticated communications need to proceed among parties who may never have met, and who communicate entirely over data links using store and forward networks. In fact the communicating parties may not be people, but rather computerized authorizing agents that follow some fixed set credit approval mechanism that refers to bank account records and spending patterns. As a step along the way to key management that can support such processes, reliance may be placed on a third party who certifies the identity of a person, role, or entity, and who binds that identity to a cryptographic parameter that can be used for several security functions, including but not limited to establishment of authenticated secure channels.

Suppose that Alice belongs to a community that agrees on the use of Diffie-Hellman parameters, p and x as above. Also, suppose that Alice (and likewise everyone else in the community) generates a random number $r_A$, and a public random component $rc = x^{r_A}$ mod p. Next Alice submits her ID information together with rc to a certificate authority used by everyone in the community. The certificate authority then creates a message digest from rc and ID, and signs the digest using the DSA (the NIST Digital Signature Standard), producing a certificate in the form of a vector $$C_A = (ID, rc, sign(ID, rc)).$$

Note that Alice does not reveal the random number $r_A$, which she keeps secret. Thus the amount of trust she must put in the certificate authority is somewhat limited. Actually, even though the certificate authority (CA) never gets access to the secret parts of public key pairs, the user community must put a lot of trust in the CA.

If everyone in the community gets a similar certificate, we have implicitly created two-point netkeys that can be used to authenticate both sides of a communication channel. This is because for any two certificates, corresponding to any two individuals or entities A, B, in the community, there may exist a unique netkey $$n_{AB} = f_1(x^{r_A r_B}).$$

This netkey is implicitly bound by the certificate authority to the identities given in the certificates for entities A and B. This netkey can be used for all bilateral communications and agreements between the entities A and B.

Under a key management method using this netkey, when Alice contacts Bob, the two exchange certificates $C_A$ and $C_B$, verify the signatures, compute the bilateral netkey $n_{AB}$, and then proceed to use Method 2, as above. That is, they perform a Diffie-Hellman key exchange forming a new Diffie-Hellman variable, dh for this call, and compute the cryptovariable $cv = f_3(dh, n_{AB})$. All of the benefits of method 2 accrue. The result is a simple protocol which will work well for all communications over permanent, switched, and virtual circuits. However, the scheme does not support connectionless network communications, nor broadcast communications.

Method 4: Secure Store-and-Forward and Broadcast communications:

Suppose that Alice wants to send a secure email message to Bob, Dan, and Carol. She composes the message, m, generates a random message cryptovariable $cv_m$, and uses it to encrypt the message. We presume that the message is very long, with lots of attachments, so that it is unreasonable for Alice to encrypt the message differently for each recipient. A typical network communication system might allow her to send one message to the network, with instructions to broadcast it to the three named recipients. So, Alice sends the same encrypted message to Bob, Carol, and Dan, together with a plaintext routing header, used by the mail network, and with a security header that includes the means for each of the three to decrypt the message.

The security header includes a common part and an entry for each recipient. Assume that Alice and Bob have a common netkey $n_1$, and that Alice and Carol and Dan share a common netkey $n_2$. For the common part of the security header, Alice generates a random number $S_m$, and includes that in the clear. The entire security header will be:

$S_m$

Bob: $h(n_1, S_m) \oplus cv_m$

Carol, Dan: $h(n_2, S_m) \oplus cv_m$

Here, the function $h(,)$ is the SHS hash algorithm (the NIST Secure Hash Standard) applied to the concatenation of its arguments, and then projected to the same number of bits as the message cryptovariable. The symbol $\oplus$ denotes binary vector sum.

The reason that the message cv is not encrypted directly by the netkey for each recipient is that when there are multiple recipients it would be possible for Dan, for example, to recover the secret netkey for Bob and Alice.

This approach, in comparison to others, is fairly simple, yet requires only a small overhead in the message size. For each recipient, we only need send an additional 14 hex characters, if we use DES to encrypt the message, plus labeling overhead.

If Alice does not have any pre-stored netkeys, but has access to a public directory of certificates, and she herself has a certificate $C_A$, then Alice can proceed as above by constructing bilateral netkeys as in method 3 above. She constructs a security header that looks like:

$C_A, S_m$

Bob: $h(x^{r_A r_B}, S_m) \oplus cv_m$

Carol: $h(x^{r_A r_C}, S_m) \oplus cv_m$

Dan: $h(x^{r_A r_D}, S_m) \oplus cv_m$

In each individual entry of the security header, the first argument of h is the common netkey variable derived from certificates as in method three. This store and forward scheme is not as secure as the circuit-based key exchanges described above. This is because if, say, Bob's secret key $r_A$ is compromised, then all messages sent to Bob can be read, including messages that may have been recorded by an intruder before the compromise occurred. This problem can be limited somewhat using a protocol that's a bit more complicated and requires more support:

Method 4B: Use of Temporary Keys:

In key management schemes for email, the use of X.509 certificates administered in the context of an X.500 directory server is generally assumed. Therefore, if Alice wants to send a message to Bob, she can look up both his email address and his security certificate at the same source. If both Bob and Alice want to be a little bit more careful in protecting messages, Bob can make available to Alice a mechanism for temporary variables: Bob generates a new temporary variable pair $r_{B,t}$, $x^{rB,t}$ weekly. Bob can either publicly post or send Alice the public value, together with an index value $t_B$, and an expiration date for the pair. In either case, the public value may or may not be signed using Bob's digital signature (which itself is certified by the certificate authority, and is not to be confused with the key exchange certificate described above). This week's temporary variable can be used by everyone in the community to send messages to Bob. When Alice does so, Bob's entry in the security header of Alice's message will look like this:

Bob: $t_B$, $h(x^{rArB}, x^{rB,tBrA,tA}) \oplus cv_m$

In this case, Alice needs to reciprocate and provide a temporary variable, and post the public part, or include it in the security header. Now Bob can destroy the secret part of the temporary variable anytime after the expiration date plus some reasonable grace period, and Alice can destroy her temporary variable used above anytime. However, if the security header is:

$C_A$, $t_A$, $x^{rA,t}$, expiration data

Bob: $t_B$, $h(x^{rArB}, x^{rB,tBrA}, t^A) \oplus cv_m$

Carol: $t_C$, $h(x^{rArc}, x^{rc,tcrA,tA}) \oplus cv_m$

Ted: $t_T$, $h(x^{rArD}, x^{rD,tDrA,tA}) \oplus cv_m$

Then the recipients can use the temporary variable that Alice posted in the header in order to respond to the message.

It is not difficult to construct a security header format that allows a mixture of Methods 4 and 4B. Under the assumption that people will send messages with the best security they have available to them, and although a mixture of method 4 and 4B reduces the overall security to method 4 under the weak link theory, there does seem to be added security value above use of Method 4 only.

Also note that if the temporary keys are signed then there may be no need to use the netkey in addition to the temporary key in order to construct the cover variable for the message key. However, we assume here that the temporary variables will not always be signed.

Combination of Methods:

In the sequence of methods described above, they can all be used in a protocol that permits the strongest and most convenient means to be used in any given situation. For example, suppose Alice and Bob want to set up a secure voice call, then Method 2 can be the default, but if no common netkey were available, then either method 1 can be used to establish a common netkey (as outlined in Method 2A), or method 3 can be used.

One skilled in the art will appreciate that the invention may be embodied in other specific forms without departing from the spirit thereof. The invention is intended to be embraced by the appended claims and not limited by the foregoing embodiment.

What is claimed is:

1. In an apparatus for communicating securely over an insecure communication channel of the type providing for a calling entity and a called entity, each having such apparatus, to establish a cryptovariable for encryption and decryption, the apparatus comprising means for retrieving or generating a first secret parameter in each apparatus;

exchanging variables over said insecure channel including one-way transformations of said first secret parameters;

independently computing in each apparatus a cryptovariable from said exchanged variables and said first secret parameters;

transmitting from each apparatus over said insecure channel data encrypted according to said cryptovariable; and decrypting in each apparatus data received over said insecure channel according to said cryptovariable, an improvement characterized by means for independently computing in each apparatus an antispoof variable from said exchanged variables and said first secret parameters; and means in each apparatus for displaying said antispoof variables;

whereby a user associated with said calling entity and a user associated with said called entity may conversationally exchange said antispoof variables, may conclude that a third entity is interposed between said called and calling entities if said antispoof variables do not agree, and may terminate the communication thereupon.

2. In an apparatus for communicating securely over an insecure communication channel of the type having means for a calling entity and a called entity, each having such apparatus, to establish a cryptovariable fer encryption and decryption, the apparatus comprising means for retrieving or generating a first secret parameter in each apparatus;

exchanging variables over said insecure channel including one-way transformations of said first secret parameters;

independently computing in each apparatus a cryptovariable from at least said exchanged variables and said first secret parameters;

transmitting from each apparatus over said insecure channel data encrypted according to said cryptovariable; and decrypting in each apparatus data received over said insecure channel according to said cryptovariable, an improvement characterized by means in each apparatus for storing and retrieving second secret parameters and indices each uniquely associated with a particular one of said second secret parameters; means for each entity to exchange with the other over said insecure channel lists of said indices;

means in each apparatus for determining from the exchanged lists whether the called and calling entities have an index in common;

said means in each apparatus for computing said cryptovariable computes said cryptovariable from said. exchanged variables, said first secret parameter, and said particular one of said second secret parameters associated with the index determined to be common to the called and calling entities.

3. A method for a calling entity and a called entity to communicate securely over an insecure communication channel wherein:

each entity retrieves or generates secret parameters;

each entity computes a one-way transformation from one or more of the secret parameters;

the entities exhange variables including the one-way transformations;

the entities independently compute, from their own secret parameters and from the variables exchanged from the other entity, a cryptovariable;

the entities independently compute, from their own secret parameters and from the variables exchanged from the other entity, an antispoof variable;

users associated with the entities verify that the antispoof variables agree; and the entities conduct transmission over the insecure channel of data encrypted according to the cryptovariable before transmission and decrypted according to the cryptovariable after reception if the antispoof variables agree; or the entities terminate the communication if the antispoof variables do not agree, whereby secure communication is not attempted if a third entity is interposed between the calling entity and the called entity.

* * * * *